Nov. 15, 1949. L. ZILLIOTTO 2,488,364
ELECTRIC FOOD MIXER
Filed Jan. 20, 1948 3 Sheets-Sheet 2
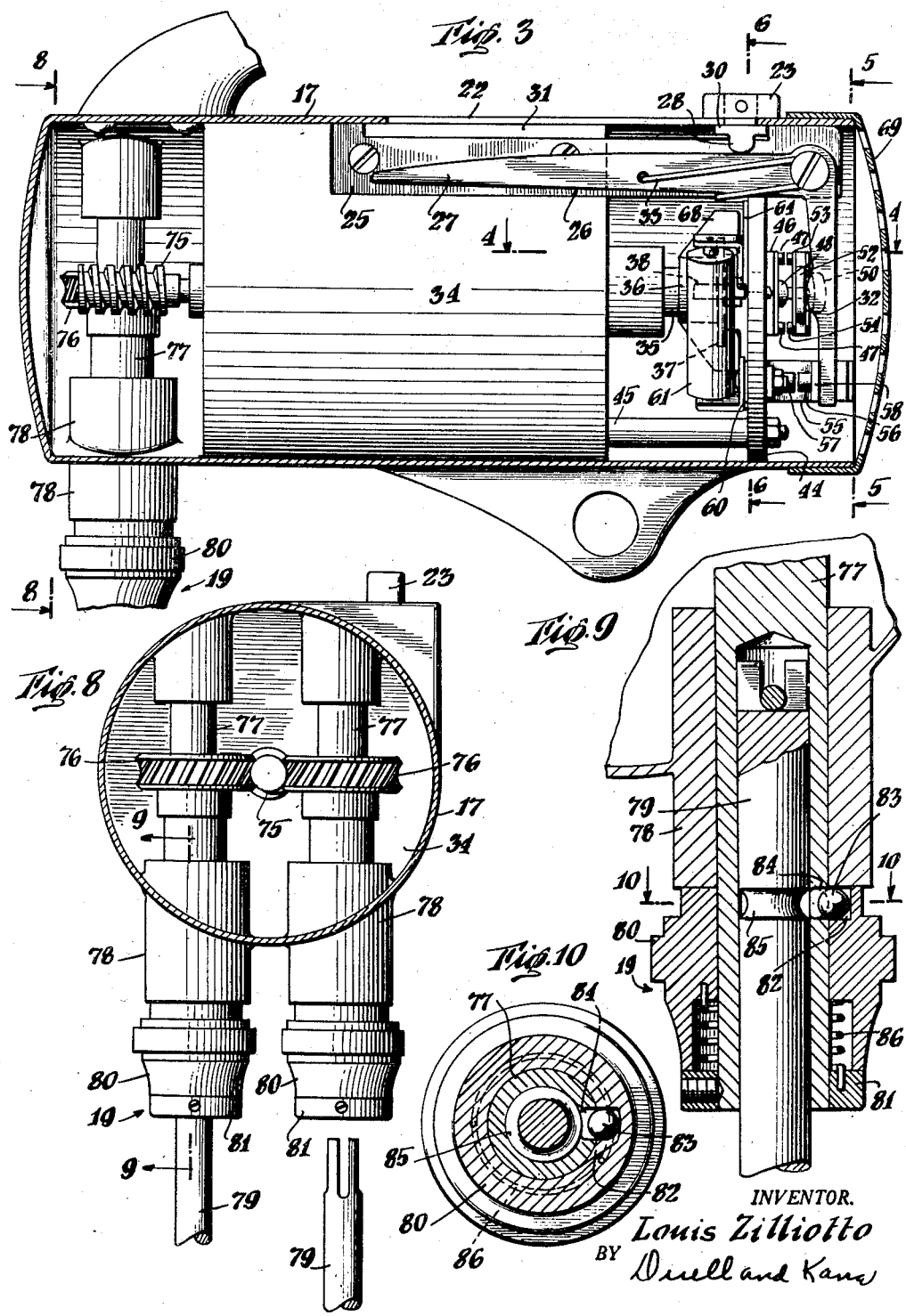
INVENTOR.
Louis Zilliotto
BY Duell and Kane
ATTORNEYS

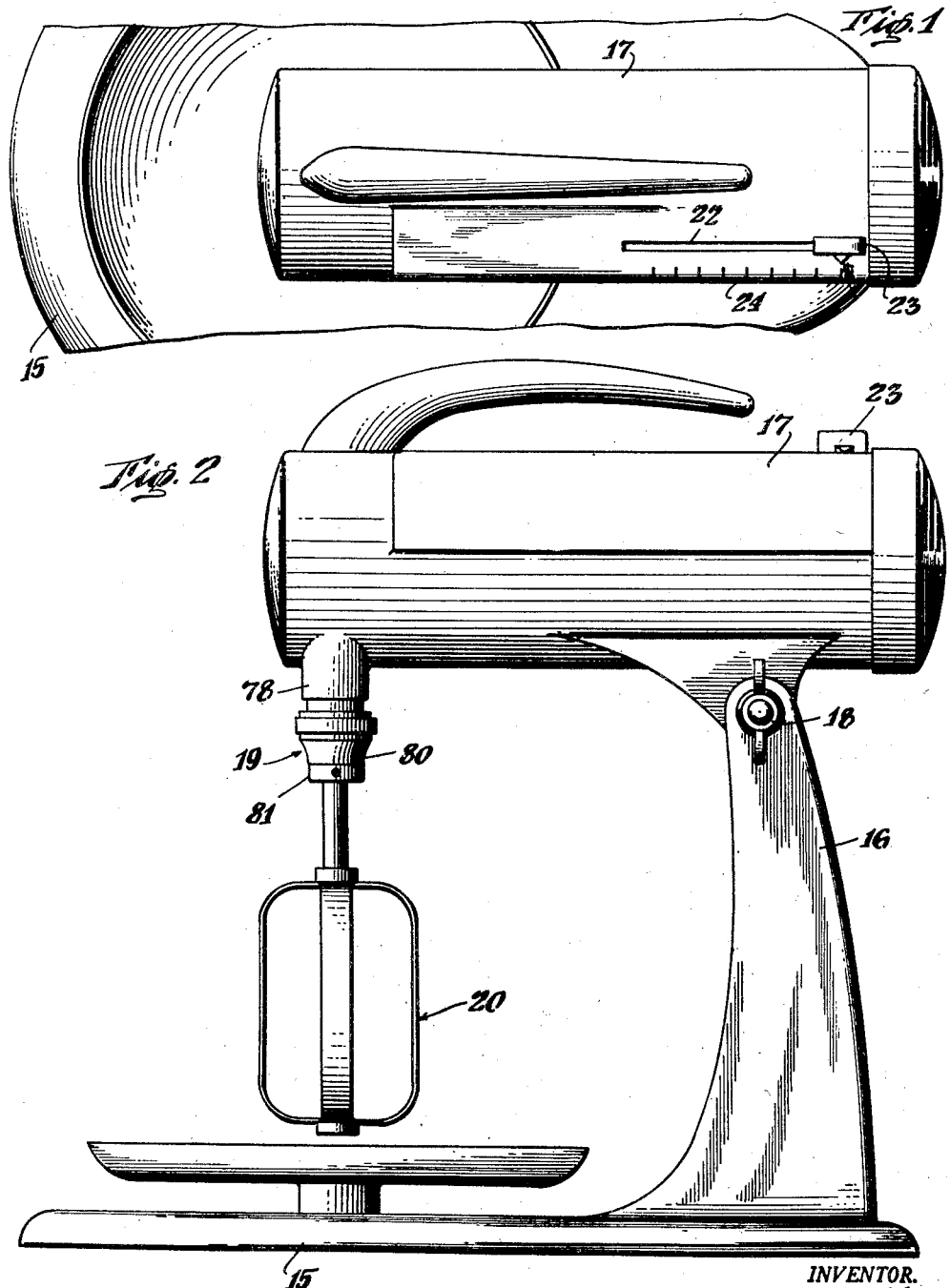

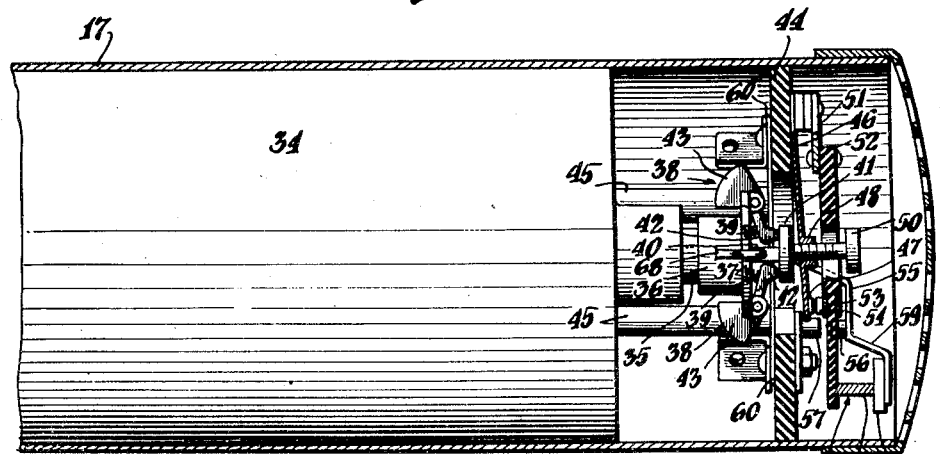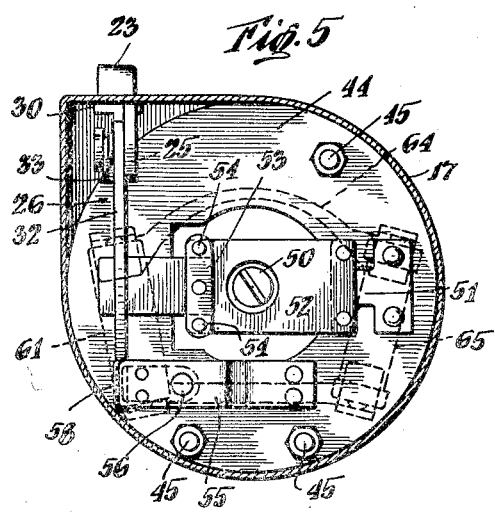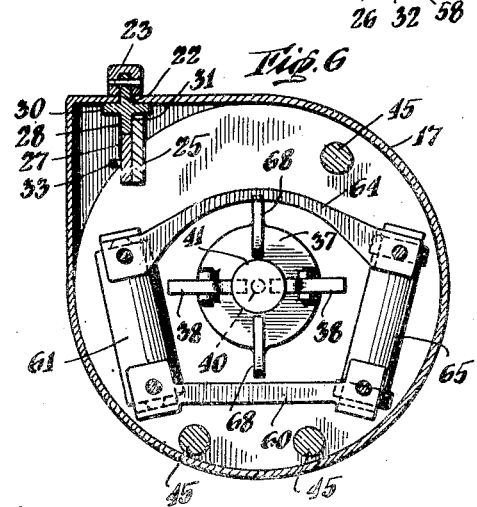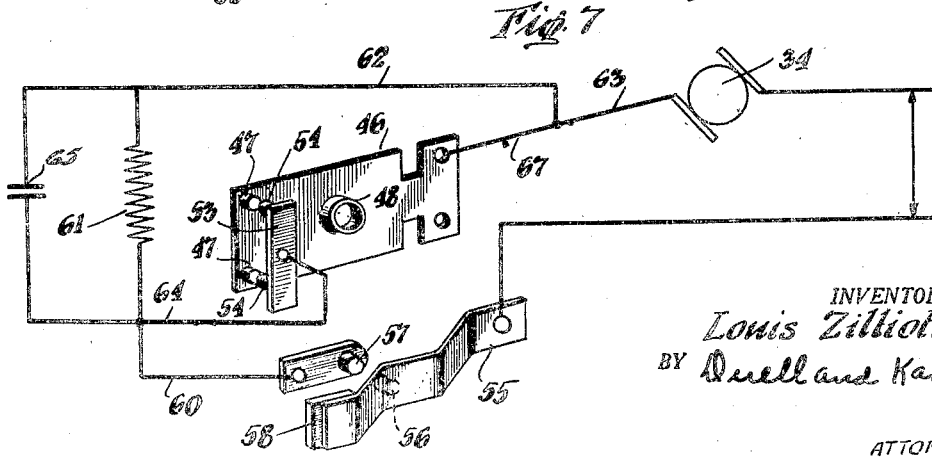

Patented Nov. 15, 1949

2,488,364

UNITED STATES PATENT OFFICE 2,488,364

ELECTRIC FOOD MIXER

Louis Zilliotto, Richmond Hill, N. Y., assignor to E. A. Laboratories, Inc., Brooklyn, N. Y., a corporation of New York Application January 20, 1948, Serial No. 3,274

5 Claims. (Cl. 318—325)

1

This invention relates to improvements in electric food mixers and the like.

It is well known that conventional electric food mixers provide for controlling the speed of the motor over a relatively large speed range so that the beaters, mixers, or other attachments may be driven at a speed most suitable to the task at hand. Some of the well known food mixers have a rotatable cap at the end of the motor housing, said cap controlling a speed governor or a variable resistor to establish the desired motor speed. When it is considered that the conventional mixers provide for removing the motor and attachment head from its usual supporting stand so that the mixer may be used at the stove or other location, it will be seen that since one hand is employed in holding the mixer, the adjustment or change of speed is a two hand operation, and it may be inconvenient for the operator to use her other hand for adjusting the speed. For example, she may be blending sauces or the like and pouring one ingredient into the container while maintaining the contents thereof under agitation by the mixer. The present invention provides a means whereby a readily accessible slider or knob is placed convenient to the handle so that the thumb or a finger of the hand which is supporting the unit can adjust the governor knob to derive the correct motor speed.

It is also known that the shafts of the attachment tools of domestic food mixers seat within sockets provided in the drive shafts of the units. Usually a spring or other frictional means is employed to retain the shaft within the drive shaft socket. When the detent is new it is difficult to insert and remove the accessory tool, and after continued use, frictional detents become ineffective properly to hold the accessory tool and the tool may drop out of the spindle sockets.

The present invention embodies a positive detent which is independent of frictional devices and affords means whereby the accessory tools may be easily locked in position and removed.

It is therefore an object of the invention to provide a domestic appliance such as a food mixer or the like, having improved speed adjustment and tool-securement means.

It is another object of the invention to provide a simple, easily adjusted speed governor control for the motor of an electric food mixer.

It is a further object of the invention to provide a speed governor for an electric motor, said governor including a bell crank having means whereby rectilinear movement of a conveniently accessible slider regulates the spacing of motor-

2 circuit contacts to establish a desired motor speed.

It is another object of the invention to provide a main control switch and a speed control device for the motor of an electric food mixer, said switch and speed control device being operated by rectilinear movement of a slider conveniently accessible on the motor casing.

It is a further object of the invention to provide a quick-acting chuck for the securement of an attachment tool to the drive spindle of a food mixer or the like.

It is yet another object of the invention to provide improved means for retaining the shaft of an attachment tool within the drive spindle of a food mixer or the like, said means affording immediate release of said shaft when desired.

In the accompanying drawings:

Fig. 1 is a top view of the motor housing of a food mixer embodying the present invention, showing the speed control adjustment means in "off" position;

Fig. 2 is a side elevation of the mixer showing the beaters in operative position;

Fig. 3 is a side elevation of the motor housing, partly in section, showing the speed control adjustment means in the Fig. 1 position;

Fig. 4 is a plan section, taken on lines 4—4 of Fig. 3;

Fig. 5 is an end view of the motor housing, the casing being in section, and showing in end elevation the speed control assembly;

Fig. 6 is a vertical end elevation taken on the arrows 6—6 of Fig. 3;

Fig. 7 is a schematic wiring diagram of the motor circuit;

Fig. 8 is a front elevation on lines 8—8 of Fig. 3 showing the beater shaft drive means;

Fig. 9 is an enlarged view in vertical sectional elevation showing the securement means for the beater shaft; and Fig. 10 is a plan section taken on lines 10—10 of Fig. 9.

Referring initially to Fig. 2 an electric food mixer or the like includes a base 15, a column 16, and a motor housing 17 pivotally and removably supported on said column by a suitable wing nut clamp 18. A chuck 19 removably receives the shaft of a beater 20 or like accessory tool.

The motor housing 17 is formed with an axially extending slot 22 within which rides the speed adjustment and switch knob 23. As shown, the knob has an index pointer, for cooperation with the speed designations 24 provided on the motor housing.

Suitably supported within the motor housing, as on a plate 25, there is a bell crank 26 (see Fig. 3) with leg 27 of which the nose 28 of an element secured to the knob 23 is in slidable contact. Said element has a flange 30 which bears against the underside of the motor housing and rides within a slot 31 formed in the plate 25, to provide stability for the knob 23. The other arm 32 of the bell crank actuates the main switch and regulates the speed governor, as later described. A suitable spring 33 operates on the bell crank leg 27 and urges the bell crank into clockwise rotation with respect to Fig. 3. It is noted that the bell crank leg 27 tapers from a point adjacent its pivot point, to provide a curved or sloping cam surface adjacent the casing 17. Therefore, as the knob 23 is moved to the left of Fig. 3 the bell crank will be rotated in a clockwise direction by the action of spring 33.

Motor 34 is fixed within housing 17 and to the shaft 35 of the motor is affixed for rotation therewith, a collar 36 having a flange 37. Pivotally supported on said flange diametrically thereof are the governor dogs 38, 38. Slidably carried by said sleeve 36, as by a shaft 40 fitting snugly but slidably within a central bore is a disc 41, the inner surface of which engages with the ends of the governor dog legs 42, 42. Each of said dog legs is spring pressed, see springs 39, Fig. 4, into engagement with the disc 41. Each of the governor dogs has a weighted extension 43, the center of gravity of which is such that as the motor shaft and collar 36 rotate, centrifugal forces will cause the respective legs 42 to withdraw from the disc 41.

A wall 44 of insulation material is suitably supported within the motor housing 17 as by the stud bolts 45 or equivalent. Said wall has a relatively large aperture, (see Figs. 4 and 5) which accommodates the disc 41. Secured to a face of wall 44 is a metallic spring leaf 46 having a pair of contacts 47 (see Fig. 7) and a threaded boss 48, which receives an adjustment screw 50 an end of which bears against the center of the disc 41 as shown in Fig. 4. The spring leaf 46 is biased for movement to the left of Fig. 4 and it is obvious that such movement will be limited by the position of the disc 41.

Springs 39 have sufficient strength to counteract spring leaf 46 and said leaf is continuously urged to the right of Fig. 4 until the engagement of the edges of counterweights 43 with the base wall of the flange slots through which they extend, limits the rotation of the governor dogs. The weights 43 are so balanced that as the motor increases and decreases there will be a movement of disc 41 and spring leaf 46 to the left and right.

Also supported on wall 44, as by a spring link 51 there is a lever 52 of insulation material, said lever carrying intermediate its ends a metallic bridging strip 53 provided with contacts 54 in registry with contacts 47 on the spring leaf 46. Lever 52 is apertured to permit adjustment of screw 50 as appears in Figs. 4 and 5.

There is also secured upon wall 44 a spring member 55 normally biased for movement to the left of Fig. 4. Said spring member 55 carries contact 56 for cooperation with fixed contact 57, also mounted upon insulating wall 44. As appears in Figs. 4 and 5 the lever arm 32 extends between the lever 52 and an insulation block 58 affixed to a wall of spring member 55. It will therefore be seen that as the bell crank 26 rotates in a clockwise direction its arm 32 will positively propel the lever 52 to the left of Fig. 4, and will permit the spring arm 55 to follow.

Referring now to Fig. 7, it will be seen that the lever 55 and the associated contacts 56 and 57 comprise the main control switch of the motor circuit. Said circuit is completed to the motor 34 through conductor 60, resistance 61 and conductors 62—63. There is also provided a second motor energizing circuit which includes conductor 60, conductor 64, the bridging contact 53, the metallic spring 46, and conductors 67 and 63 to the motor. It will be obvious that when the bridging contact 53 is closed against contacts 47 of spring 46, the resistance 61 is out of the circuit and the motor will run at maximum speed. It is understood that a condenser 65 across resistance 61 is for the usual purpose of minimizing arcing at the several switch contacts.

With knob 23 at the right of Fig. 3, all contacts are open. The contacts 56 and 57 are so spaced and the contact spring member 46 so positioned that when the knob 23 is moved sufficiently to cause contacts 56 and 57 to close, bridging contact 53 will still be out of circuit closing relationship with respect to the contact 47. Resistance 61 will then be in the circuit and the motor will commence at slow speed. If there is no further movement of the knob 23 to the left of Fig. 3 the motor will continue to run at such speed. However when it is desired to increase the motor speed knob 23 is moved along slot 22 and as it does so will urge the lever 52 and the thereon mounted bridge contacts 53 toward the contacts 47, until said contacts are closed and 61 out of the circuit.

If the motor speed increases the centrifugal forces acting on the dogs 38 will cause the legs 42 thereof to retract from the disc 41 whereupon the spring contact 46 will move to bring the contacts 47 out of circuit closing relationship with the bridging contact 53. Resistance 61 will be reinserted in the circuit, the motor will reduce speed and spring contact 46 will return to circuit closing relationship with the bridging contact 53.

The rotating collar 36 is also useful to cool the motor and is thereby provided with wings or blades 68 which supplement the counterweight portions of the dogs 38 in creating an air flow which moves axially of the motor, the front of motor housing 17 and the rear closure plate 69 thereof being suitably apertured for air flow.

Figs. 3 and 8 show the relationship of a worm gear 75 with the cooperating gears 76 which are affixed to the accessory drive spindles 77. Said spindles are journalled in the bearings 78 affixed to the motor housing and each is socketed, see Fig. 9, to drivingly receive the end of an attachment tool shaft 79.

Means are provided to positively retain the attachment tool shaft in driving relationship with the spindle socket and yet permit the easy insertion and removal with respect thereto.

A collar 80 is rotatably carried on the end of each spindle 77, as by the ring 81. The upper end of each collar 80 is provided with a cam slot 82 for cooperation with a detent or key member, such as a ball 83. The wall of spindle 77 is apertured as at 84 to receive said detent; when the detent is a ball, it must have a diameter suitably larger than the thickness of the socket wall. The attachment shaft 79 has an annular groove 85 within which a portion of the detent 83 fits when it is driven through the aperture 84 by pressure of the wall of the cam slot 82 thereagainst. A spring 86 tends always to rotate the collar 80 counterclockwise of Fig. 10 thereby normally urging the detent 83 through the wall aperture 84 and into keying relationship with groove 85. To secure the attachment tool shaft into the spindle socket, the collar 80 is rotated clockwise into the Fig. 10 position and the shaft 79 is inserted into the spindle socket until its slotted end engages therewith the cross pin within the socket as clearly appears in Fig. 9. The pocket at the end of the cam slot permits the retraction of detent 83 into the wall of spindle 77. Then, upon releasing the collar 80, the spring 86 will rotate the same as aforesaid and the detent will be driven through the aperture 84 until it seats within the groove 85. It is apparent that in such position the ball provides a positive lock against the withdrawal of the attachment tool shaft.

It is desirable that the collars 80 rotate freely on the spindles 77. The collars are, in effect, resiliently coupled to the respective spindles by the attachment of the springs 86 to the rings 81, and because of the inertia of said collars, sudden change in speed will cause a rotation movement of the collars with respect to the spindles. Centrifugal forces acting on the detent 83 urge them outwardly of the grooves 85, and should the collar accidentally rotate to a position where the base of the cam slot aligns with the detents, the latter may disengage from the slots 85 and release the attachment shafts.

An important characteristic of the speed governor control embodying the present invention is the gradual speed change afforded thereby. It precludes any rapid decrease or increase of the motor sufficient to cause the inertia forces acting on the collars to induce rotation thereof independent of the spindles, and accidental disengagement of the detents is prevented.

Thus, among others, the several objects of the invention as afore noted are achieved. Obviously numerous changes in construction and rearrangement of the parts might be resorted to without departing from the spirit of the invention as defined by the claims.

I claim:

1. In a motor driven food mixer or the like, having a housing, a motor therein, an energizing circuit therefor, said circuit including a high resistance leg, a circuit shunting said resistance, and a switch in said shunting circuit, said switch including a spring biased contact support mounted within said housing and a second spring-biased contact support mounted within said casing for cooperation with said first contact the combination of a collar mounted on said motor shaft for rotation therewith, a member slidably mounted within said collar at the axis thereof and having an enlarged head member disposed adjacent said first-named contact support means; a plurality of weighted governor dogs pivotally supported on said collar and having leg members engageable with said head member, said leg members moving toward or away from said head member by centrifugal action as the motor speed decreases or increases; screw-threaded means for adjusting the position of said first named contact support relative to said head member, said screw threaded means having an element engaging with said head member; a bell crank mounted within said housing and having a leg engaging with the support means of said second contact to adjust the same relative to said first contact support means upon rotation of said bell crank; and means mounted on said housing and accessible externally thereof for rotating said bell crank.

2. In an electric food mixer or the like, having a housing, a motor therein, a spindle journalled in said housing and rotatable by said motor, said spindle having a socketed end, an attachment tool having shaft means removably positioned within said socket to be rotated thereby, the combination of a ball projectable through said socket wall for reception within a recess in said tool shaft, and a collar rotatably carried by said spindle and having cam means engageable with said ball to project the same upon rotation of said collar in one direction and to permit said ball to retract from said tool shaft upon rotation of said collar in another direction when it is desired to remove said shaft from said socket, whereby said shaft is releasably secured in said socket.

3. In an electric food mixer or the like, having a housing, a motor therein, a spindle journalled in said housing and rotatable by said motor, means for attaching a tool shaft to said spindle in telescoping relationship, the combination of a detent projectable from a surface of said spindle into keying relationship with said tool shaft or retractable to disengage from said tool shaft, and movable cam means carried on said spindle and cooperating with said detent to project the same into said keying relationship or to permit said detent to release from said shaft according to the direction of movement of said cam means, said cam means including means for urging the same normally into detent projecting position, whereby said tool shaft is releasably secured to said spindle.

4. In a motor driven food mixer or the like, having an electric motor, an energizing circuit for said motor, a main switch included in said circuit having a fixed and movable contact, said movable contact being mounted on an arm spring biased into closed circuit position, a high resistance in series therewith, a circuit shunting said resistance, and a switch in said shunting circuit, said last named switch including a pair of cooperating contacts, one contact being said arm member, and the other contact being mounted on a spring biased member, the combination of a contact in said circuit movable in an axial direction by changes in motor speed and a cooperating contact adjustably mounted relative thereto to establish a predetermined motor speed range at which said movable contact will make or break with said cooperating contact; and a bell crank mounted in said housing and having a leg engaging with the mounting of said first contact to move the same upon rotation of said bell crank, and a second leg of said bell crank extending axially of said housing and adjacent an inner wall thereof, an edge of said second leg tapering from a point adjacent the pivot of said bell crank to the end of said leg, a slider member guided for movement along said housing wall and engageable with said tapering edge throughout the extent of movement of said member; and a spring means acting on said bell crank to urge said second leg always into engagement with said slider member, whereby said bell crank will rotate in one or another direction according to the direction of movement of said slider member.

5. In an electric motor-driven food mixer or the like, having a housing, an electric motor therein, an energizing circuit for said motor, said circuit including a main switch, a secondary switch in series therewith, and a high-resistance circuit paralleling said secondary switch, said secondary switch including a movable contact and a fixed contact adjustable relative thereto, whereby the extent of movement of said movable contact before engaging with said fixed contact may be preestablished and having a spindle journalled in said housing and rotatable by said motor, said spindle having a socketed end, and an attachment tool having shaft means removably positioned within said socket to be rotated thereby; the combination of bell crank means common to said main switch and said secondary switch for making or breaking said main switch and adjusting the relative position of the contacts of said secondary switch, means for rotating said bell crank; a ball projectable through said socket wall for reception within a recess in said tool shaft, and a collar rotatably carried by said spindle and having cam means engageable with said ball to project the same upon rotation of said collar in one direction upon making said main switch and to permit said ball to retract from said tool shaft upon rotation of said collar in another direction upon breaking said main switch when it is desired to remove said shaft from said socket, whereby said shaft is releaseably secured in said socket.

LOUIS ZILLIOTTO.

REFERENCES CITED

The following references are of record in the file of this patent:

UNITED STATES PATENTS

| Number | Name | Date |
| --- | --- | --- |
| 1,298,196 | Gairing | Mar. 25, 1919 |
| 2,106,058 | Nielsen et al. | Jan. 18, 1938 |
| 2,213,191 | Johnston | Sept. 3, 1940 |
| 2,241,528 | Srauss et al. | May 13, 1941 |
| 2,421,213 | Moody | May 27, 1947 |